Inventor:
Joseph A. Sharpe

Dec. 4, 1945. J. A. SHARPE 2,390,187
SEISMIC SURVEYING
Filed Oct. 22, 1941 3 Sheets-Sheet 2

Inventor: Joseph A. Sharpe
By Paul T. Hawley
Patent Agent

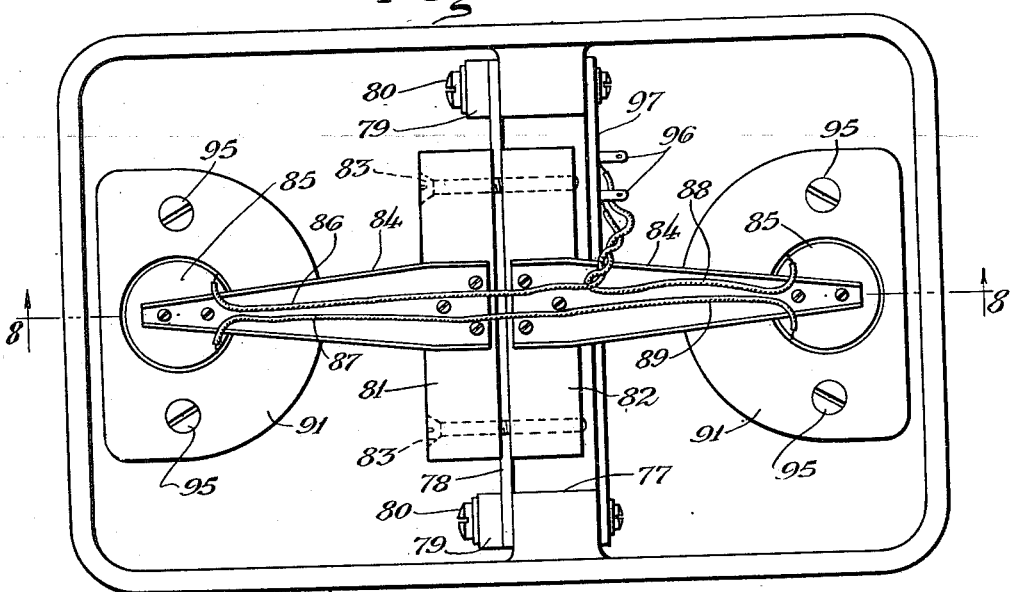
Fig. 7a.
Fig. 7.
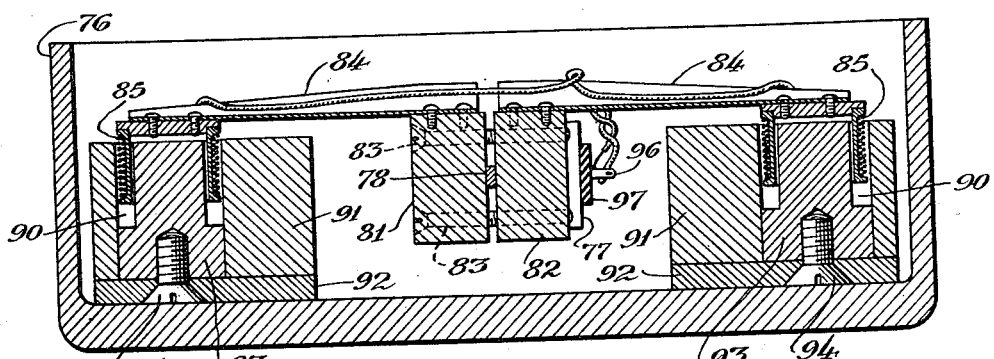
Fig. 8.
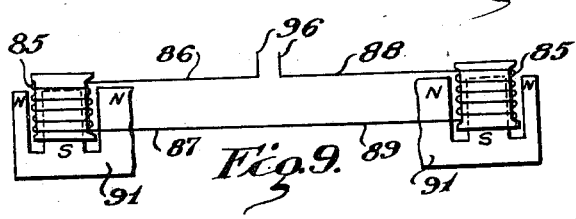
Fig. 9.
Inventor:
Joseph A. Sharpe
By Paul T. Hawley
Patent Agent Patented Dec. 4, 1945

2,390,187

UNITED STATES PATENT OFFICE 2,390,187

SEISMIC SURVEYING

Joseph A. Sharpe, Tulsa, Okla., assignor to Stanolind Oil and Gas Company, Tulsa, Okla., a corporation of Delaware Application October 22, 1941, Serial No. 416,112

9 Claims. (Cl. 181—0.5)

This invention pertains to the art of seismic geophysical prospecting and more particularly to a method for determining properties of formations encountered below the surface of the earth without drilling to such formations.

While seismic surveying has enjoyed a wide popularity in exploration geophysics during the last few years this type of prospecting as heretofore practiced has been valuable in general only for the determination of the depth and dip of subterranean formations prior to drilling. The only lithological characteristic of the formations which has been determined is the velocity of propagation of elastic compressional waves through the formations.

I have found that by employment of a new technique which is taught in this specification it is possible not only to determine the depth and dip of various of the subsurface formations or beds, but that one can also obtain information with regard to the actual elastic properties of the beds themselves and thereby predict the type of formations existing in the various layers without the necessity of drilling. This type of information is of great importance, particularly in such activities as geophysical prospecting for oil. When the geophysicist is able to predict not only the presence or absence of a structure favorable for the accumulation of a deposit of oil, but can also determine with reasonable accuracy whether the formations of interest are limestone, sandstone, shale, etc., he has increased the resolving power of his method and has given increased information upon which to appraise the value of the prospect prior to drilling.

It is an object of this invention to determine by seismic prospecting methods the relative values of at least two mechanical characteristics of the various subsurface formations.

I accomplish the desired results by making measurements at the same location, and preferably simultaneously, of the reflected compressional waves received from subsurface interfaces between formations, and the reflected transverse or rotational waves from the same interfaces. Therefore it is an object of this invention to provide a method and apparatus for the determination of reflected transverse seismic waves, preferably simultaneously with the measurement of reflected compressional waves, or at least at the same geographical location. Further objects of this invention will be apparent from the description of the method contained in the present specification.

In the customary method of seismic surveying dynamite is detonated at a point usually below the water table. This explosion generates seismic waves which are propagated in all directions, the most rapid of these waves radiating from the source as compressional waves. When such waves impinge on an interface between two beds of different elastic properties or of different relative densities, part of the energy in the wave is reflected back to the surface in the form of a compressional wave. This is the customary wave which has been recorded and utilized in seismic reflection prospecting. Little attention has been paid in the past to the phenomenon that at the instant of impact on the elastic wave on the formation, other waves are also generated. For example, transverse or rotational waves are usually generated at the same instant. These waves are characterized by the fact that the direction of particle motion is at right angles to the path the wave is taking. In effect they cause rotation of the medium rather than translation in the direction of the wave propagation, which is the case with a compressional wave. Normally there is a transverse wave reflected upwards towards the surface and a refracted transverse wave which is propagated downward into the second medium. The angle at which the reflected transverse wave is propagated back towards the surface depends upon the angle of incidence of the initial compressional wave upon the interface, and upon the mechanical properties of the rock lying above the interface. By the determination of the travel times of the various transverse or rotational waves from the various interfaces it is possible to obtain additional information with regard to the subsurface and it is possible to deduce from this information and from the corresponding information with regard to the reflected compressional waves various characteristic elastic properties of the formations encountered.

In order to describe this invention more clearly certain figures have been attached hereto as a portion of this specification. They constitute illustrations of only one embodiment of the method and as such they are not to be considered as limitations on the application of this method. In these figures use of the same reference numeral refers to the same or corresponding part.

Figure 7 is a plan view of a seismometer used to record rotational waves;

Figure 7a is a detailed view of an element of the seismometer;

Figure 8 is a cross section along line 8—8 of Figure 7, and

Figure 9 is a wiring diagram showing the electrical connections of the seismometer.

Figure 1:
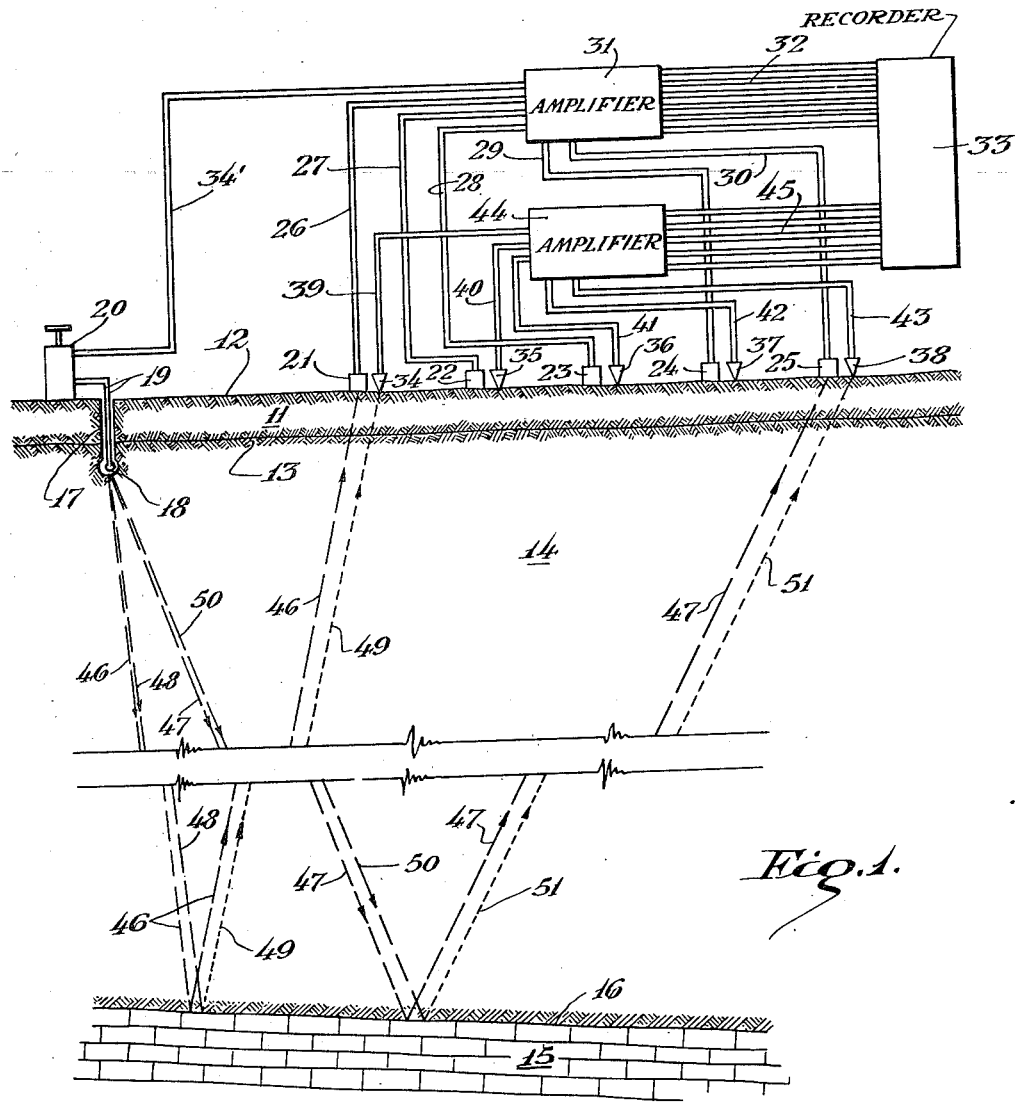
Figure 1 is a diagrammatic cross section of the portion of the earth's crust together with equipment used in carrying out the invention.

In Figure 1 is shown a cross section of a somewhat idealized portion of the earth's crust showing a layer of unconsolidated or weathered material 11 lying below the surface 12 of the earth and separated by interface 13 from a consolidated formation 14. A second bed 15 lies below this bed 14 and is separated therefrom by interface 16. Other formations will lie below formation 15 in the same fashion. A well 17 has been drilled through the weathered layer and into the consolidated formation 14. A suitable charge of explosive 18 is placed in this well connected by two wires 19 with a blaster 20. Some distance away a line of seismometers 21, 22, 23, 24 and 25 have been placed on or immediately adjacent the surface of the earth. These seismometers are responsive only to the vertical component of the waves striking the surface of the earth and for simplicity are hereinafter called "vertical seismometers." The seismometers are connected by cables 26, 27, 28, 29 and 30, respectively, to a multi-channel amplifier 31 whereby the response of the vertical seismometers can be suitably amplified. The output of the various channels are individually connected by means of a multi-conductor cable 32 to a conventional seismic recorder or oscillograph 33. A separate cable 34' is connected from the blaster to one channel of the multi-channel amplifier 31 so that the instant of detonation of the charge of explosive 18 can be suitably recorded on the oscillograph 33 in a manner well known in this art. The equipment described thus far is standard and is of the type used by former investigators in this field. The multi-channel amplifier 31, for example, may contain suitable filters and a volume control if desired.

A second group of seismometers 34, 35, 36, 37 and 38 is also planted, preferably adjacent to the corresponding vertical seismometers. This last group of seismometers is composed of instruments responsive to rotational waves and relatively insensitive to either horizontal or vertical compressional waves. Such instruments are referred to as "rotational seismometers." One such type of instrument will be described hereinafter in connection with Figures 7 and 8. These rotational seismometers are connected through cables 39, 40, 41, 42 and 43 to a second multi-channel amplifier 44. I have discovered that each channel of this second multi-channel amplifier 44 can be constructed identical to a channel of the amplifier 31 and can be furnished with the same type of filters and volume control as therein employed.

The outputs of the channels of multi-channel amplifier 44 are individually connected by wires in a multi-conductor cable 45 to recording elements in the oscillograph 33.

It is apparent that with this equipment it is possible to record simultaneously upon the same strip of photosensitive paper or other recording medium, as a function of time, the response of a set of vertical seismometers and the response of a similar set of rotational seismometers to the seismic waves generated as a result of the detonation of the charge of dynamite 18 in well 17. Although this is probably the most convenient method of assembling the apparatus for the determination of the response to both reflected compressional waves and reflected rotational waves, it is not necessary that this recording be simultaneous. As an alternative, the equipment used in recording the vertical component of the waves can first be employed, after which a second record may be made using the same recording equipment but connecting each of the various cables, such as 26 through 30, to the corresponding rotational seismometer. Again, separate equipment can be used entirely and the response of the earth to the shock generated in well 17 can be recorded at one time for the vertical component of the seismic waves and at a different time for the response to the rotational waves. It is preferable in this last case that the same seismometer stations be used for the two sets of seismometers.

When the charge of explosive 18 is detonated seismic waves are propagated in all directions. The paths of certain waves which are of importance have been indicated in Figure 1. The compressional wave reflected from the interface 16 to seismometer 21 follows path 46, which is characterized by the fact that the angle of incidence of the wave on interface 16 is equal to the angle of reflection from this interface to seismometer 21. Similarly, the compressional wave reflected from interface 16 to the last seismometer 25 follows path 47. The first rotational wave to reach seismometer 34 from bed 15 is the resultant of a compressional wave traveling along path 48 to interface 16 at which point the so-called reflected rotational wave is generated, traversing path 49 up to seismometer 34. Similarly, the first reflected rotational wave from interface 16 to reach seismometer 38 is the resultant of a compressional wave traveling path 50 until interface 16 is encountered, whereupon a reflected rotational wave is generated, traversing path 51 to seismometer 38.

Figures 2, 3:
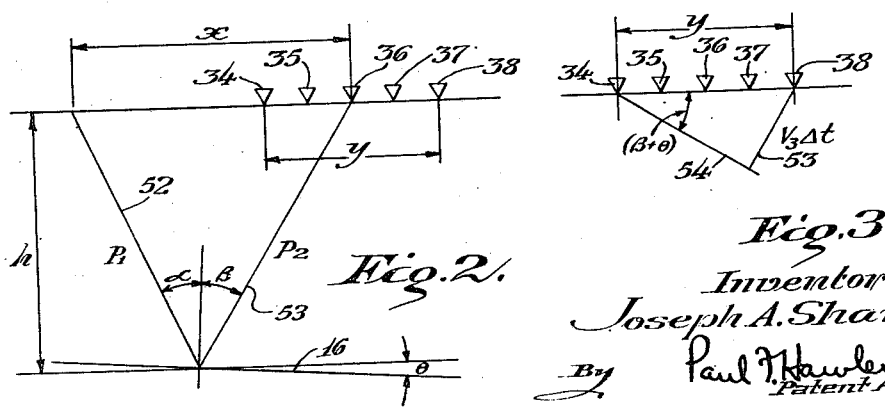
Figures 2 and 3 are geometrical representations of the paths of certain seismic waves shown in Figure 1, and illustrate more clearly the paths of the waves involved in this embodiment of my invention.

It should be noted that the angle of reflection of the rotational wave generated at the interface is not equal to the angle of incidence of the incident compressional wave. This is shown in Figure 2. The particular wave path shown in Figure 2 is the one striking the middle seismometer 36 of the group. In this figure the point of detonation of the explosive has been shown on the same level with the seismometers. While it is usually impossible in practice to achieve this result, it is possible to reduce the travel-times of the various waves to values which would have been obtained had such an emplacement been possible. The calculations used to render this relationship possible are subsequently described.

A compressional wave along path 52 of length $p_1$ impinges upon interface 16 at an angle $\alpha$. A rotational wave is generated and propagated upward at an angle $\beta$ with respect to the interface 16. It traverses path 53, of length $p_2$, to impinge upon seismometer 36. The theoretical relationship between angles $\alpha$ and $\beta$ has been determined to follow Snell's law, namely, $$\frac{\sin \alpha}{V_1} = \frac{\sin \beta}{V_2} \quad (1)$$

where $V_1$ is the velocity of the compressional wave and $V_2$ is the velocity of the transverse or rotational wave. These velocities are the velocities in the formation just above the reflecting interface, and hence are characteristic of the particular stratum immediately above that at which the reflection takes place.

In Figure 2 the distance from the surface to the interface at the point of incidence of the particular wave paths 52 shown is designated as $h$. The distance from the shot point to the central seismometer 36 is $x$. The seismometer spread, i. e. distance from first to last seismometer, is $y$. The angle of dip of the particular bed shown is designated as $\theta$. The time between detonation and response of seismometer 36 to the particular wave under discussion is $T$. The difference in time for the wave to strike seismometers 34 and 38 is referred to as $\Delta t$. With reference to Figure 2, the following relationships are then apparent:

$$T = \frac{p_1}{V_1} + \frac{p_2}{V_2}$$

or $$T = \frac{h}{V_1 \cos(\alpha - \theta)} + \frac{h}{V_2 \cos(\beta + \theta)} \quad (2)$$

$$x = h(\tan(\alpha - \theta) + \tan(\beta + \theta)) \quad (3)$$

A fourth equation can be derived from the consideration of Figure 3. In Figure 3 line 54 shows the wave-front of the reflected transverse wave at the instant that such wave impinges on seismometer 34. This wave front is perpendicular to path 53 and hence is at an angle $(\beta + \theta)$ with respect to the horizontal surface of the earth. As is apparent from this figure, the end seismometer 38 is actuated an interval of time $\Delta t$ later, where $\Delta t$ is determined by the distance perpendicular to the wave front 54 from this wave front to the seismometer 38 at the instant shown, and the velocity $V_3$ of the transverse waves at this particular point. From the geometry of this figure, $$y \sin(\beta + \theta) = V_3 \Delta t$$

or $$\sin(\beta + \theta) = \frac{V_3 \Delta t}{y} \quad (4)$$

From the survey which has already been made using the normal method of reflection seismic prospecting the value of the dip angle $\theta$ can be computed in a method well known in the art. Similarly, the value for $h$ can be obtained from the reflection prospecting data with an error of not more than plus or minus 10 feet. $V_1$ is known either from well shooting data or from previous seismic surveys made in the conventional manner. The above four equations contain as unknowns only the values $\alpha$, $\beta$, $V_2$ and $V_3$. Having four equations and four unknowns, it is possible to determine exactly the value of all of these unknowns. As these equations are long and involved it is felt that there is no point in setting the same forth here. The solution is obvious to anyone skilled in the art.

Normally the information which is of particular importance is the value of the velocity $V_2$ of the rotational wave immediately above the interface 16. This quantity is not of importance in itself but from it can be computed coefficients indicative of the mechanical properties of the bed involved.

The velocities of seismic waves are dependent upon the elasticity and mass of the particular formation under consideration. The exact relationship has been determined by many investigators and is given as:

$$V_1 = \sqrt{\frac{\lambda + 2\mu}{\delta}} \quad (5)$$

and $$V_2 = \sqrt{\frac{\mu}{\delta}} \quad (6)$$

where $\lambda$ is the first Lamé coefficient, $\mu$ is the shear modulus of the material and $\delta$ is the density.

From Equations 5 and 6 the value for $\mu$ and $\lambda$ can be derived in terms of the two velocities and the density. However, values of these coefficients are not so useful as the value of the compressibility. Compressibility is defined as the ratio of a hydraulic stress to the resultant hydraulic strain or change in volume, and in terms of the two coefficients given above, is found to be:

$$K = \lambda + \tfrac{2}{3}\mu \quad (7)$$

In terms of the quantities defined in Equations 5 and 6 the compressibility $K$ is given as:

$$K = V_1^2 \delta - \tfrac{4}{3} V_2^2 \delta$$

or $$\frac{K}{\delta} = V_1^2 - \tfrac{4}{3} V_2^2 \quad (8)$$

Thus by knowing the value of the two velocities as determined from the seismic surveying system shown in Figure 1, it is possible to obtain the value of the ratio of the compressibility to the density of the formation lying above each interface. Prior to my invention this quantity could only be obtained by obtaining a sample of the material and testing the sample at the surface.

The value of this invention is apparent from a study of the table, which gives average relative values for $K/\delta$ for various rocks, and which shows that this ratio varies markedly from one material to another.

Table

| Material | Relative $K/\delta$ |
|---|---|
| Sandstone (Triassic) | 61.3 |
| Sandstone (Tertiary) | 38.2 |
| Granite | 8.45 |
| Limestone | 6.3 |
| Anhydrite | 5.8 |
| Clay | 2.5 |
| Gravel (unconsolidated) | .003 |

It is apparent from this table that it is possible to distinguish between limestone, sandstone, clay gravel or other kind of formation and thus identify the class of formation lying above the interface from which the seismic reflections came. Thus for the first time it is possible without the use of well drilling apparatus and associated sample-taking apparatus to determine within reasonable limits the types of formations to be encountered at various depths.

In actual practice, the seismometers are in general placed considerably higher than the level at which the shot is fired. However, a correction applied to the resultant travel times by means of which the results can be computed as if the seismometers were at the shot level. This is accomplished by subtracting from each travel time determined, the time for the up-coming wave to travel from shot level to the seismometer under consideration. Methods for making these so-called "weathering corrections" have been already described and are well known in the prior art.

It is not necessary to use the particular configuration of seismometers relative to the shot point shown in Figures 1 and 2. The same type of information can be obtained when using, for example, a "split-spread" in which the shot is the center point of two sets of symmetrically placed lines of seismometers. The same type of Equations 1 to 5 derived in connection with Figure 2 can similarly be determined for this configuration. The invention is not limited to any one particular form of arrangement of equipment.

Figure 4:
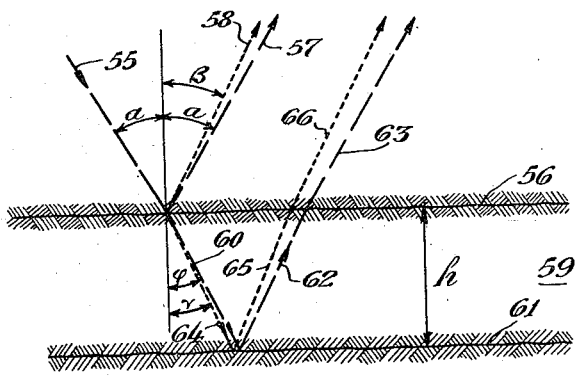
Figure 4 is a geometrical representation of the paths of certain seismic waves reflected and refracted at the upper and lower interfaces of a bed and illustrating in part another embodiment of my invention.
Figure 5:
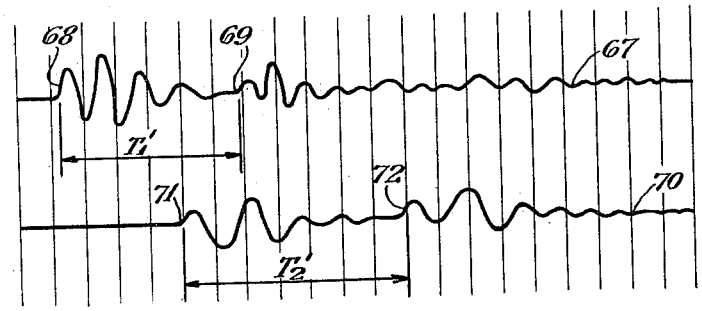
Figure 5 illustrates two sections of seismic records showing the arrival of certain of the waves part of whose paths are shown in Figure 4.

Another embodiment of my invention is illustrated by Figures 4 and 5. In Figure 4 a compressional seismic wave path 55 is shown. The wave traveling this path impinges upon the interface 56 between two beds at an angle $\alpha$. As already described, if there is a difference in the elastic constants of the beds on the two sides of this interface a reflected rotational wave is generated, traveling along a path 58. Part of the energy in the initial compressional wave is refracted into the bed 59 below the interface 56. Some of this refracted energy is in the form of a compressional wave traveling along the path 60 to interface 61 between bed 59 and the next bed below. Part of this refracted wave is here reflected and travels back to the surface along paths 62 and 63. Another component of the refracted energy is in the form of a rotational wave which travels a path 64 in the bed 59 and in turn is reflected at interface 61 back to the surface along paths 65 and 66. There is, of course, further refraction and reflection at the interfaces 56 and 61, but the waves traveling along the paths shown are those which contain by far the greatest portion of the original wave energy and hence will be the most perceptible of the waves reaching the surface from the upper and lower interfaces of bed 59. In passing it might be noted that the wave paths 58 and 66 are parallel, as are the wave paths 57 and 63.

When the compressional waves traveling along paths 57 and 63 reach the surface the compressional seismometers are actuated twice, roughly speaking, with an interval of time between which represents the travel time of the compressional wave along the paths 60 and 62. Similarly, there is an interval between the initial response of the rotational seismometer to the waves along paths 58 and 66 due to the travel time of the rotational waves along paths 64 and 65. Obviously if the thickness $h$ of the bed 59 is small it is impossible to distinguish between the arrival of the waves from the upper and lower interfaces. This is, of course, quite often the case. However, in the case of thicker beds, it is possible to distinguish the time interval between the arrival of these waves, and in that case this embodiment of the invention becomes of great usefulness. The record of the compressional seismic waves is inspected to find the arrival of two closely spaced reflections indicative of the arrival from the top and bottom interfaces of a bed. One trace on such a record is shown as line 67 in Figure 5, with the arrivals of the two compressional waves shown at points 68 and 69. These two arrivals are separated by an interval of time $T_1'$ which can be computed from the record. A section of the corresponding record of the reception of rotational waves is shown in the lower part of this figure with a single seismometer trace, line 70. Here the arrival of the two rotational waves reflected from the top and bottom of the bed 59 are shown as points 71 and 72 separated by a time interval $T_2'$. The arrival 71 is associated with the arrival 68 and is recognized as such by a knowledge of the depth of the reflected bed already obtained from the travel time on the compressional wave record and from the knowledge of the rotational wave velocity already obtained as described above.

The time intervals $T_1'$ and $T_2'$ are utilized as follows: The total length of the paths 60 and 62 is given by the formula:

$$D_1 = \frac{2h}{\cos \phi}$$

Similarly, the total lengths of the paths 64 and 65 are given by the formula:

$$D_2 = \frac{2h}{\cos \gamma}$$

where $$\frac{\sin \alpha}{V_1} = \frac{\sin \phi}{V_3} = \frac{\sin \gamma}{V_4}$$

and $V_3$ and $V_4$ are the (unknown) velocities of propagation of compressional and rotational waves, respectively, in the bed 59. Also, $$T_1' = \frac{D_1}{V_3} \text{ and } T_2' = \frac{D_2}{V_4} \qquad (9)$$

From these equations it is possible to obtain the exact relation between the relative values of $V_3$ and $V_4$. However, it will be found that for all practical purposes it is possible to consider the lengths of paths 60 and 62 as equal to the length of paths 64 and 65. The error involved in making this approximation will not amount to more than 10% until the angle $\alpha$ is greater than approximately 45°.

In this case $$V_3 = \frac{D}{T_1'} \text{ and } V_4 = \frac{D}{T_2'}$$

$$\frac{V_3}{V_4} = \frac{T_2'}{T_1'} \qquad (10)$$

From the relationship given in Equations 5 and 6, $$\frac{V_3^2}{V_4^2} = \frac{\lambda + 2\mu}{\mu} = \left[\frac{T_2'}{T_1'}\right]^2 \qquad (11)$$

or expressed in terms of Poisson's ratio:

$$\left[\frac{T_2'}{T_1'}\right]^2 = \frac{2 - 2\sigma}{1 - 2\sigma}$$

or $$\sigma = \frac{R^2 - 2}{2(R^2 - 1)} \qquad (12)$$

where $$R = \frac{T_2'}{T_1'}$$

The value of Poisson's ratio can therefore be obtained for the bed under consideration, simply from the value of the ratio of the two time differences $T_2'$ and $T_1'$. The value of this ratio, (the ratio of the change in unit length of a piece of stressed material at right angles to the direction of stress relative to the elongation per unit length in the direction of stress) is sensitive to changes in the grain size, cementation, porosity, and fluid content of the material. Accordingly, lateral changes in the value of Poisson's ratio from point to point along the bed indicate changes in the lithologic character of the bed. This information is of definite economic importance, particularly in efforts to determine the location of so-called "stratigraphic traps." It has been found that if there is a lateral change in permeability of an oil bearing formation, there was a tendency to dam the migration of the oil which normally occurred during geologic time, and accordingly cause the accumulation of this oil at the trap. Obviously ordinary seismic surveying in which only the depth of the various beds is obtained, will not give sufficient data to enable one to detect the presence of such a trap, whereas, the method disclosed above will enable this information to be obtained.

Figure 6:
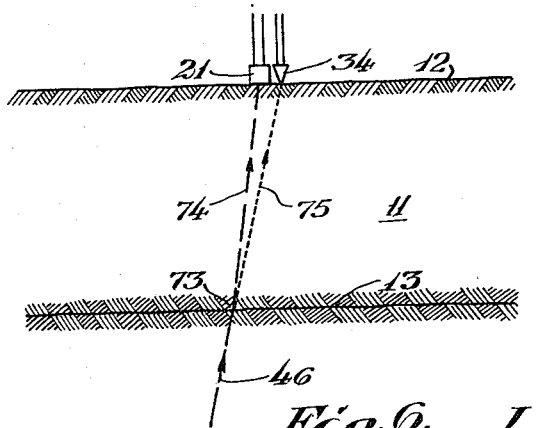
Figure 6 is a diagrammatic representation of certain wave paths reaching the surface of the ground through the weathered layer and illustrates a further embodiment of my invention.

It is also possible to evaluate Poisson's ratio for the material composing the weathered layer by a slight modification of the above method. This is illustrated by Figure 6 which is a representation of a small part of the cross section of the earth shown in Figure 1 near the location of seismometers 21 and 34. A compressional seismic wave 46 reflected from some subsurface discontinuity is shown impinging on the bottom 13 of the weathered layer at point 73. Since there is a change in the elastic properties of the formations at this point a rotational wave is generated at this point. The compressional wave follows a path 74 to the seismometer 21 and a component of the rotational wave follows a very similar path 75 to the rotational seismometer 34. In practice the paths will be much more coincident than would appear from the exaggerated representation of Figure 6. The resultant seismic records of the compressional and rotational waves shows a rotational wave arriving at the rotational seismometer 34 immediately adjacent the compressional wave receiver 21 at a very small time interval $t$ after the arrival of the compressional wave. It is by the fact that this interval of time $t$ is very short that this particular rotational wave can be identified as having been generated at the interface 13.

The length of the two paths 74 and 75 is for all practical purposes the same. If this length is called $d$ the relationship between $t$, $d$ and the velocities $V_5$ and $V_6$ of the transverse and longitudinal waves, respectively, in the weathered layer is as follows:

$$t = \frac{d}{V_5} - \frac{d}{V_6} \quad (13)$$

Solving this expression for $V_5$ one obtains $$V_5 = \frac{dV_6}{tV_6 + d} \quad (14)$$

or $$\frac{V_6}{V_5} = \frac{tV_6 + d}{d}$$

For all practical purposes the paths of the waves 74 and 75 are nearly enough vertical so that $d$ can be considered to be the thickness of the weathered layer at this point, which can be obtained by any of the methods already well known in the art. $V_6$, the velocity of compressional waves of the weathered layer is also a quantity which can be determined by prior art methods. $t$ is read off the record. Therefore, the ratio of $V_6$ to $V_5$ can be determined. Poisson's ratio $\sigma$ can be obtained from $$\left[\frac{V_6}{V_5}\right]^2$$

in a manner analogous to that given in connection with the explanation of Figures 4 and 5. The result is:

$$\sigma = \frac{r^2 - 2}{2(r^2 - 1)} \quad (15)$$

where $$r = \frac{tV_6 + d}{d} \quad (16)$$

It should be noted in passing that the value of Poisson's ratio thus obtained is only an average value since the physical constants of the material in the weathered layer vary. It has been found that this average value of Poisson's ratio is closely related to the internal resistance coefficient of this layer which is responsible for the attenuation of the seismic waves. This attenuation varies with frequency in a manner which can be correlated with the value of Poisson's ratio, and therefore one can deduce from the determination given above the variation in wave form which can be expected to occur in the seismic waves reflected on the subsurface formations. Obviously one would be suspicious of correlating reflected waves obtained at different stations on the basis of their wave form if by the method given above the average value of Poisson's ratio for the weathered layer at the two stations under consideration were distinctly different.

In order to use the information it is necessary that equipment be employed that will differentiate sharply between rotational or transverse waves on the one hand, and compressional waves on the other. As far as I know, prior to my invention no satisfactory rotational-wave-sensitive seismometer had been devised. In Figures 7 and 8 I have illustrated a type of instrument which has proved to be extremely satisfactory in this regard, combining as it does high sensitivity to rotational waves, relative insensitivity to compressional waves, and ruggedness. In the particular embodiment shown this seismometer includes a case 76 which can be of any desired shape and size, which is extended at two points to form lugs 77. A horizontal elastic suspension 78, shown in detail in Figure 7a, is attached between these two lugs by means of back plates 79 and screws 80. As shown in Figure 7a, the vertical dimension of this suspension is large at the point of attachment to the lugs, for example, three-quarters of an inch, but is decreased, for example, to one-eighth inch at all points intermediate the points of attachment, so that the suspension has a relatively low torsional spring constant. Two masses 81 and 82, which may suitably be brass parallelopipeds, are clamped by means of four screws 83 to the suspension 78. To each of these masses is attached an arm 84 at the end of which is attached a coil 85 with a vertical axis. Each coil consists of numerous turns of insulated copper wire wound around a non-conducting bobbin. The two ends of each coil are brought out and attached to insulated wires 86, 87, 88 and 89, respectively. Each coil is suspended in an annular air gap 90 formed in a pot-type magnet structure composed of a permanent magnet 91, a base plate 92 and a central pole piece 93 held together by bottom screws 94 and top screws 95. The masses, arms and coils are so positioned and attached relative to the suspension that the center of gravity of the suspended assembly is located at the center of the suspension. Two wires from the coils are connected to terminals 96 mounted on a non-conducting strip 97. The other two wires are connected together in such a way that if the case of the instrument is given a rotational acceleration about the suspension 78 the voltages in the two coils will add. The two wires that are brought out to the terminals 96 are coiled loosely so that there is negligible restoring torque from these wires to restrict the motion of the suspended system relative to the case. The electrical connections are shown diagrammatically in Figure 9.

With the coils connected in this fashion any vertical acceleration produces no resultant voltage because the voltage generated in the two coils is in opposition and hence cancels.

Horizontal motion either in the direction of the suspension or at right angles to it does not cause the coils to cut magnetic lines of force and hence generates no voltage. As a result, this seismometer is very insensitive to linear motion in any direction. On the other hand, it is sensitive to any rotation of the case about a line parallel to the long axis of the suspension since in this situation there are equal and opposite relative motions between each coil and the attendant magnet, thus generating voltages which are in additive relationship with respect to the terminals 96. A suitable cover and connector are, of course, provided for normal field use.

It is apparent from the specification that my invention has wide application in the determination of the physical properties of the earth's strata and that it is not limited to the particular type of equipment or arrangement of equipment shown and described in this specification.

I claim:

1. Apparatus for seismic surveying including means for generating seismic waves, a plurality of electric seismometers, each responsive only to the simultaneous rotational effect of the horizontal and vertical components of transverse waves, and means for recording the output of each of said seismometers on a common record as a function of time in a manner to record each of said outputs distinguishably from the others of said outputs.

2. A method of seismic geophysical prospecting including the steps of generating seismic waves below the weathered layer of the earth, receiving the compressional and rotational waves reflected from subsurface discontinuities at the surface of the earth with separate sets of spaced seismometers, one of said sets of seismometers being responsive only to said rotational waves and recording the waves received by said sets of seismometers by separate traces for each set of seismometers, each trace being recorded as a function of time.

3. A method of seismic geophysical prospecting including the steps of generating seismic waves at least as low as the bottom of the weathered layer of the earth, receiving at a plurality of spaced points near the surface of the earth compressional waves reflected from subsurface discontinuities, generating electric signals responsive substantially solely to said compressional waves, recording said electric signals as a function of time by a first trace on a record, receiving with seismometers responsive only to rotational waves at a plurality of spaced points near the surface of the earth rotational waves generated at subsurface discontinuities, generating electric signals responsive solely to said rotational waves, recording said last-mentioned electric signals as a function of time by a second trace on said record, and recording on the record of the first and second traces the instant of generating said seismic waves, whereby a physical characteristic of the subsurface formations in addition to the depth thereof can be ascertained.

4. A method of seismic geophysical prospecting comprising generating seismic waves, receiving compressional waves at a plurality of points near the surface of the earth, generating electric signals at each of said points responsive to the vertical component of said compressional waves, amplifying and recording said electric signals as a function of time by a first trace on a record, receiving rotational waves at said plurality of points near the surface of the earth with seismometers responsive only to said rotational waves, generating electric signals at each of said points responsive to said rotational waves only, amplifying and recording said last-mentioned electric signals as a function of time by a second trace on said record, recording on said record the instant of generation of said seismic waves, and determining from said record the velocity of rotational waves in the earth strata, whereby indications of the physical properties of said strata can be obtained.

5. A method of seismic surveying in which seismic waves are generated by the detonation of a charge of explosive, the instant of detonation is recorded on a record, and a first trace is recorded on a record of the vertical components of compressional waves reflected from subsurface formations and received at a plurality of spaced points near the surface of the earth, the steps of receiving with seismometers responsive only to rotational waves at substantially the same spaced points rotational waves reflected from subsurface formations and recording a second trace on said record of said rotational waves as a function of time.

6. A system for seismic geophysical prospecting comprising means for generating seismic waves, means for receiving compressional waves reflected from subsurface discontinuities to the surface of the earth, means for receiving only rotational waves reflected from subsurface discontinuities to the surface of the earth, a record, and means for recording on said record separate traces each as a function of time of the compressional and rotational waves received by both of said receiving means.

7. A system for seismic geophysical prospecting comprising means for generating seismic waves at least as low as the bottom of the weathered layer of the earth, means for receiving at a plurality of spaced points near the surface of the earth compressional waves reflected from subsurface discontinuities, means for generating electric signals responsive substantially solely to said compressional waves, a record, means for recording said electric signals by a first trace on said record as a function of time, means responsive only to rotational waves for receiving at a plurality of spaced points near the surface of the earth rotational waves generated at subsurface discontinuities, means for generating electric signals responsive solely to said rotational waves, means for recording said last-mentioned electric signals by a second trace on said record as a function of time, and means for recording on the record of said first and second traces the instant of generating said seismic waves, whereby a physical characteristic of the subsurface formations, in addition to the depth thereof, can be ascertained.

8. Apparatus for seismic prospecting including means for generating seismic waves, a plurality of electric seismometers responsive substantially only to the vertical components of seismic waves, a plurality of amplifiers connected to said seismometers, a second plurality of electric seismometers responsive only to a rotational component of seismic waves, a second plurality of amplifiers connected to said second plurality of electric seismometers, means for recording on a record the instant of generation of said seismic waves, and means for recording the output of each plurality of said amplifiers on separate traces on said record.

9. Apparatus for seismic surveying comprising means for generating seismic waves, a plurality of electric seismometers responsive to vertical compressional waves, a plurality of amplifiers connected to said seismometers, a second plurality of electric seismometers responsive only to rotational waves, each of said second plurality of electric seismometers being characterized by the fact that it includes a case, a torsional support, a plurality of masses torsionally suspended from said support, an arm rigidly attached at one extremity to each mass, a coil rigidly attached near the opposite extremity of said arm from said mass, a plurality of magnets so arranged that each of said coils is disposed in the air gap of one magnet, said masses, arms and coils being so assembled that the center of gravity of the suspended system is positioned in said torsional support, and an electric circuit connecting said coils so that relative rotation between coils and case produces additive potentials in all coils, a second plurality of amplifiers connected to said second plurality of electric seismometers, and an electric oscillograph each recording element of which is connected to one of said amplifiers for reording separate traces on a single record of each plurality of said amplifiers.

JOSEPH A. SHARPE.